United States Patent [19]

Khuntia et al.

[11] 4,172,511
[45] Oct. 30, 1979

[54] DISC BRAKE HOUSING MOUNTING BOLT ARRANGEMENT

[75] Inventors: Natabara Khuntia, Hudson; Charles W. Rader, Willowick, both of Ohio

[73] Assignee: General Motors Corporation, Detroit, Mich.

[21] Appl. No.: 919,775

[22] Filed: Jun. 28, 1978

[51] Int. Cl.² ............................................. F16D 59/02
[52] U.S. Cl. ...................... 188/170; 29/426; 29/446; 92/128; 192/70.27; 403/7
[58] Field of Search ............... 188/1 R, 170; 92/128, 92/130 A; 192/18 A, 91 A, 70.27; 29/426, 446; 403/7, 12, 21

[56] References Cited

U.S. PATENT DOCUMENTS

| | | | |
|---|---|---|---|
| 2,570,604 | 10/1951 | Siegerist | 403/7 |
| 3,301,359 | 1/1967 | Cole et al. | 192/4 |
| 3,688,878 | 9/1972 | Barmasse | 188/170 |
| 4,030,575 | 6/1977 | Moring et al. | 188/170 |
| 4,084,671 | 4/1978 | Teruehall | 188/1 A |
| 4,129,204 | 12/1978 | Hedgcock | 188/170 |

Primary Examiner—Edward R. Kazenske
Attorney, Agent, or Firm—D. D. McGraw

[57] ABSTRACT

An annular type disc brake assembly having parking brake apply springs which are pre-loaded is arranged for disassembly in such a manner that the load on the parking brake springs must be evenly released in small increments until there is no pre-load on the springs. This is accomplished by providing several of the securing bolts assembling the housing section containing the spring to another housing section of a different, longer length than the remaining securing bolts of this type. The longer bolts are arranged so that they can be moved translationally into position in the one housing section before assembly and have at least a portion of the bolt heads then covered by slotted safety lugs formed as a part of the one housing section. When the disc brake is to be disassembled, the shorter bolts are first removed, leaving only the longer bolts to hold the housing sections together and resist the force of the parking brake apply springs. A suitable bolt removal tool is then inserted in the head of one of the longer bolts and the bolt is threaded outwardly of the housing for only a short distance until it is prevented from further movement by its associated safety lug. The other longer bolts are so removed to a similar extent, allowing the housing section containing the springs to move away from the other housing section for a short distance. The bolts may then be removed for another short distance, limited by the safety lugs. The process is repeated until the springs no longer apply the separating force to the housing sections. The longer bolts may then be completely unthreaded, the housing section containing the springs removed, and the longer bolts then removed translationally.

1 Claim, 3 Drawing Figures

DISC BRAKE HOUSING MOUNTING BOLT ARRANGEMENT

The invention relates to an arrangement permitting the stepped installation and removal of a disc brake housing section containing parking brake apply springs relative to another housing section, slowly and incrementally compressing the spring during installation, and slowly and incrementally releasing the springs during disassembly.

IN THE DRAWING

Figure 1:
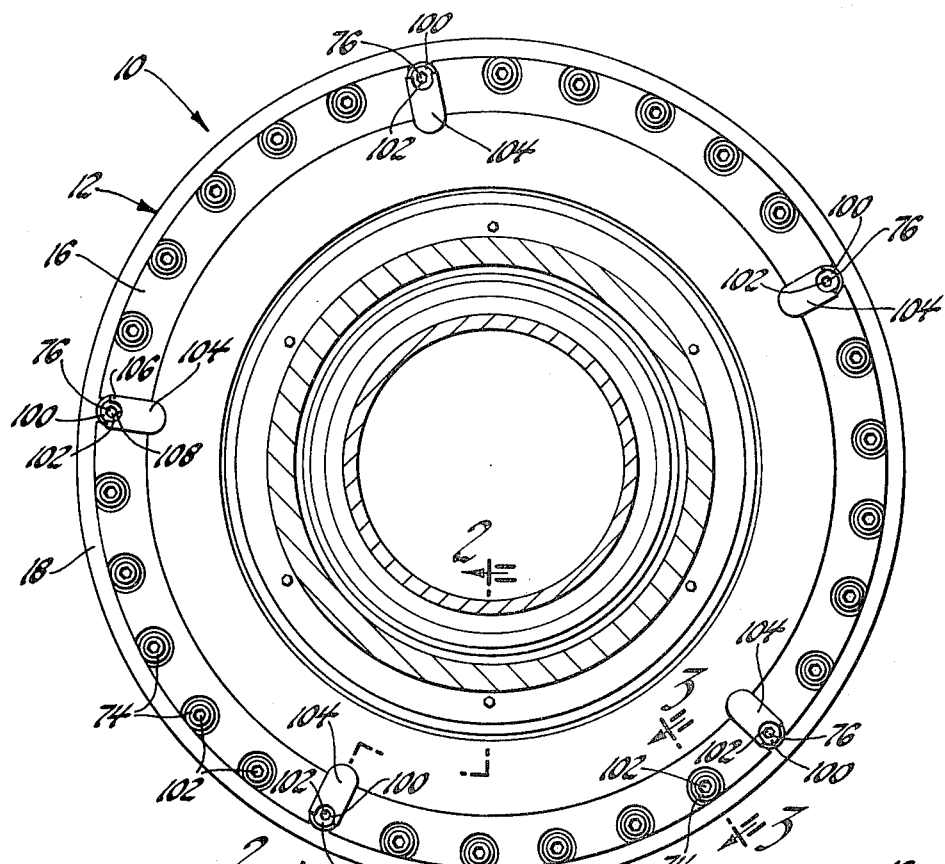
FIG. 1 is an elevation view of a disc brake assembly embodying the invention.
Figure 3:
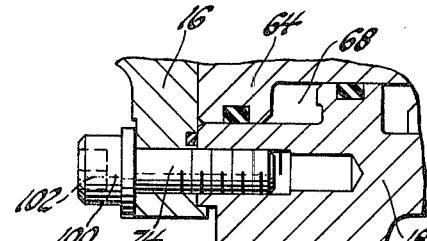
FIG. 3 is a cross section view of a fragmentary portion of the brake assembly of FIG. 1 taken in the direction of arrows 3—3 of that FIG.

The disc brake assembly 10 is of the heavy duty type commonly used in industrial vehicles, and particularly off-the-road vehicles. The assembly includes a housing 12 assembled from several housing sections. As better seen in FIG. 2, the housing includes housing sections 14, 16 and 18. The brake assembly includes a disc pack 20 formed of interleaved plates with one set of plates 22 being splined on a rotatable support member 23 and the other set of plates 26 being splined to housing section 18. Support member 24 is arranged to rotate with the wheel 28 to be braked. The housing 12 is attached to a fixed portion of the vehicle.

Housing section 14 has an annular pressure chamber 30 formed therein and opening toward housing section 16. An annular piston 32 is reciprocably received in chamber 30 to define therewith a cavity for introduction of pressurized fluid to actuate the brake. Piston 32 has a plate engaging section 34 and is arranged so that when the piston is actuated the disc pack 20 will be subjected to brake actuating force. A series of bosses 36 is provided on housing section 14 and each boss is formed with a bore 38 opening toward the disc pack 20. A piston retracting mechanism 40 is provided inside each bore 38. This mechanism includes a return spring guide pin 42 having a head 44 reciprocably movable in the bore end 46, a bore cover 48 covering the open end 50 of bore 38 and suitably secured to housing section 14, and a piston return spring 52 which is a compression spring receiving pin 42 therethrough. One end of spring 52 engages pin head 44 and the other end engages the bore cover 48 so that the spring continually urges the pin toward bore end 46. The retracting mechanism 40 also includes a cross pin 54, which is longer than the diameter of pin 42 and extends through a cross passage 56 formed near the opposite end of the pin 42 from pin head 44. The end of the pin 42 containing passage 56 extends through a stepped hole 58 formed in a part of piston 32 and having a shoulder 60 facing the disc pack 20. The cross pin 54 is contained within the enlarged portion 62 of hole 58 and engages shoulder 60 so that the retracting force of spring 52 is exerted on piston 32 and tends to move the piston in the retracting direction to disengage the disc pack 20. It can be seen that when brake actuating pressure in chamber 30 is released, the force of all of the springs 52 in all of the bores 38 will move piston 32 away from the disc pack, releasing the brake. The piston is returned to its retracted position in which it engages a part of housing section 14.

Housing section 16 has an annular brake apply piston 64 reciprocably received therein. Suitable guide pins 65 are press fitted in piston 64 and guided in recesses 67 formed in housing section 16. The piston 64 has a plate engaging section 66 which is on the opposite side of the disc pack 20 from the plate engaging section 34 of piston 32. Piston 64 and housing section 18 are constructed and arranged to define therebetween a pressure chamber 68 which when pressurized will permit pressure to act on piston 64 to move the piston in a brake releasing direction. A series of cylinders 70 formed in housing section 16 contains brake apply strings 72. As illustrated, each cylinder 70 has two such brake apply springs. The springs engage housing section 16 in cylinder 70 and also act on the back side of the plate engaging section 66 of piston 64 to urge that piston toward brake actuating relation with disc pack 20. Housing section 16 is secured to housing section 18 by a series of bolts 74 and another series of bolts 76. Bolts 74 are shorter than bolts 76. Bolts, not shown but similar to bolts 76, attach housing section 14 to housing section 18.

During normal brake operation, with the vehicle running, pressure is maintained in chamber 68 to hold off the parking brake mechanism by moving piston 64 against housing section 16 and compressing the parking brake apply strings 72. The service brakes are actuated by delivering fluid pressure to service brake chamber 30 to move the service piston 32 and compress the disc pack 20 against the plate engaging section 66 of piston 64. Brake actuation causes compression of springs 52 of retracting mechanisms 40. Upon release of the service brake pressure in chamber 30, springs 52 return service piston 32 to the brake released position. When the vehicle is to be parked, the pressure in chamber 68 is released and springs 72 move piston 64 to compress the disc pack 20 against the plate engaging section 34 of piston 32. Piston 32 under these conditions is grounded against housing section 14 so that it provides a suitable reaction plate for parking purposes.

Bolts 74 and 76 are illustrated as having heads 100 provided with hexagonal sockets 102 which are adapted to receive a hexagonal bolt installation and removal tool. Bolts of this type are commonly referred to as Allen head bolts. The safety lugs 104 are formed as a part of housing section 16 and five such circumferentially spaced safety lugs are illustrated. A sufficient number of safety lugs must be provided to assure that the bolts associated therewith have sufficient strength to be tightened against the force of the parking brake apply springs 72 and hold them statically during installation and removal. There must also be sufficient bolts 76 to provide for even installation and removal of housing section 16 relative to housing section 18. Lugs 104 extend radially outward so that their outer ends 106 terminate somewhat beyond the bolt circle on which the axes of the bolts 74 and 76 lie when installed. The lug outer ends are each provided with a slot 108 opening radially outwardly through the ends 106. The slots are of sufficient diameter to permit the insertion of the hexagonal installation and removal tool used with the bolts, but are not sufficiently large to permit the bolts 76 to be inserted axially therethrough. The inner surfaces 110 of the lugs are therefore aligned so that they will engage the heads 100 of bolts 76 when those bolts are threaded in a removal direction for the short distance between their fully installed position and the inner surfaces of the lugs.

Figure 2:
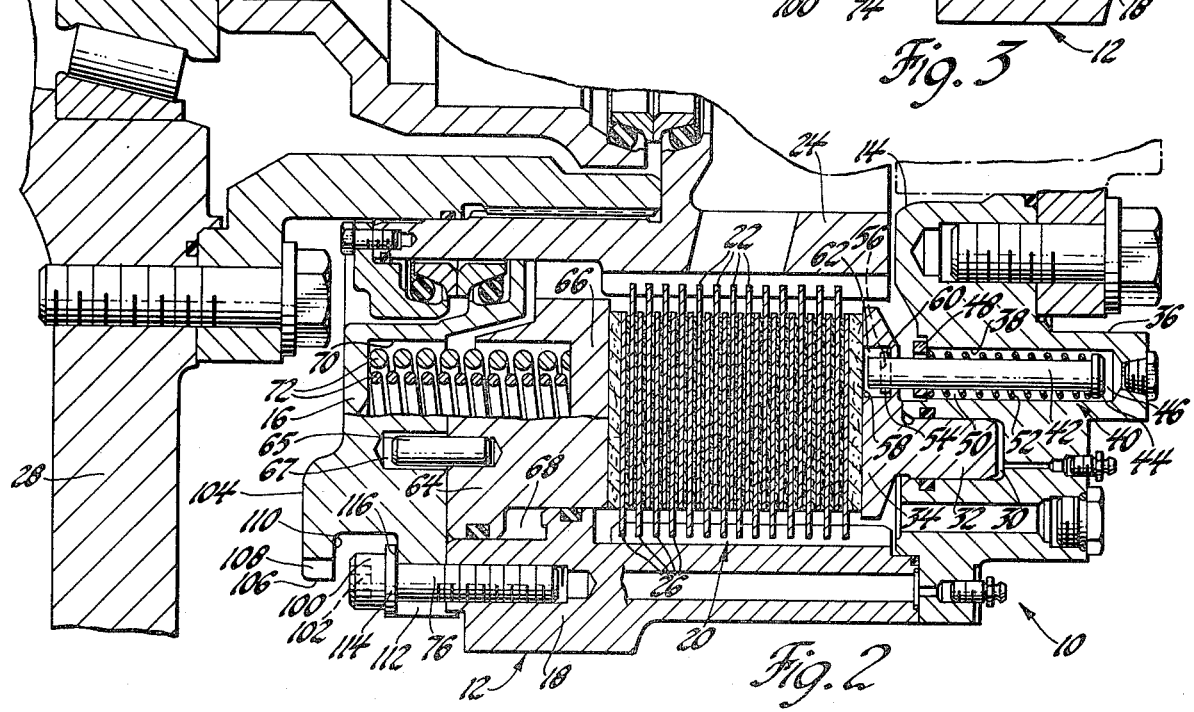
FIG. 2 is a cross section view taken through a portion of the brake assembly of FIG. 1 in the direction of arrows 2—2.

When housing section 16 is to be installed on and secured to housing section 18, the piston 64 is positioned in housing section 18 and springs 72 are placed in the piston recesses provided for them. The bolts 76 are then moved translationally through slots 112 so that the bolts' washers 114 and the bolt heads 100 are received between the surfaces 116 of housing section 16 and the surfaces 110 of lugs 104. The housing section 16 is then positioned over the guide pins 65 so that the bolts 76 are aligned with their associated threaded holes in housing section 18. The bolt installation and removal tool is then inserted through slots 108 and the bolts are incrementally tightened until housing section 16 is in position against housing section 18 as seen in FIG. 2. The shorter bolts 74 are then inserted and tightened in place.

In order to disassemble housing section 16 from housing section 18, bolts 74 are first removed, leaving only bolts 76 to hold the housing sections together against the force of apply springs 72. The installation and removal tool is then inserted in one slot 108 to engage one bolt 76 and that bolt is threaded outwardly for a short distance until its bolt head 100 engages safety lug surface 110. The installation and removal tool is then used in the same manner with another bolt 76 generally opposite the first bolt so unthreaded. This incremental removal of bolts 76 continues, gradually backing up the bolts uniformly around the periphery of the brake assembly so that the bolts release the force of apply springs 72 gradually and uniformly. This allows the bolts 76 to share the spring load substantially equally, as was done during installation.

What is claimed is:

1. In an annular disc brake assembly having a spring apply, pressure release parking brake section including a first housing section having a cylinder formed therein, an annular brake actuating piston received in said cylinder and defining therewith an annular pressure chamber for receipt of fluid pressure urging said piston toward the brake release position, a second housing section having chamber means formed therein, pre-loaded spring means in said chamber means acting between said second housing section and said annular piston and urging said annular piston toward brake actuation, said first and second housing sections having aligned bolt openings with bolt openings of said first housing section being internally threaded, the improvement comprising:

a series of circumferentially spaced bolts extending through said second housing section bolt openings and threaded along a length thereby into said first housing section bolt openings and securing said second housing section to said first housing section and collectively carrying the load of said spring means, said series of bolts including at least three bolts which are substantially equally spaced circumferentially and have a longer length than the other bolts in the series, said other bolts being greater in number than said longer length bolts, the second housing section bolt openings through which said longer length bolts extend being open ended slots for translatory movement of said longer length bolts when said housing sections are not fastened together, and safety lugs integrally formed with said second housing section, each of said lugs being positioned axially over and spaced from each of said bolt openings receiving said longer length bolts and having only a portion in axial alignment with said longer length bolts and having a slot therein through which a bolt driver can be received for tightening and loosening said longer length bolts, each of said lugs preventing more than a predetermined amount of axial movement which is less than the length of threaded engagement between said first housing section bolt openings and said threaded length of said layer length bolts in the bolt removing direction of one of said longer length bolts relative to said second housing section, said safety lugs permitting insertion of said longer length bolts into said second housing section bolt openings prior to brake assembly while limiting said axial movement of said longer length bolts in a bolt removal direction after said longer length bolts have been threaded into said first housing section bolt openings, said parking brake section being adapted to be assembled first by tightening said longer length bolts to a fully tightened position so that said longer length bolts carry the load of said spring means followed by installation of said other bolts of said series of bolts, and being adapted to be disassembled by first removing said other bolts and subsequent removal of said longer length bolts, said safety lugs limiting the removal of said longer length bolts as aforesaid due to said predetermined amount of axial movement to force all of said longer length bolts to be gradually backed up uniformly around the circumference of the brake assembly so that they continue to share the load of said spring means substantially equally during such removal, said longer length bolts being sufficiently long to relieve all of the load on said spring means upon removal before they become threadedly disengaged from said first housing means threaded bolt openings.

* * * * *

UNITED STATES PATENT OFFICE
CERTIFICATE OF CORRECTION

Patent No. 4,172,511           Dated  October 30, 1979

Inventor(s) Natabara Khuntia, Charles W. Rader

It is certified that error appears in the above-identified patent and that said Letters Patent are hereby corrected as shown below:

Column 1, line 29, "23" should read -- 24 --.

Column 2, line 14, "strings" should read -- springs --;

line 28, "strings" should read -- springs --;

line 65, after "lugs" insert -- 104 --.

Column 3, line 51, "thereby" should read -- thereof --.

Column 4, line 24, "layer" should read -- longer --.

Signed and Sealed this

Fourth Day of March 1980

[SEAL]

Attest:

SIDNEY A. DIAMOND

Attesting Officer    Commissioner of Patents and Trademarks